May 12, 1942.                D. W. POWER                 2,283,090
                  COMPOSITE GLASS AND METAL ENVELOPE
                        Filed April 30, 1941

INVENTOR
DONNELL W. POWER
Charles McClair
ATTORNEY

Patented May 12, 1942

2,283,090

UNITED STATES PATENT OFFICE 2,283,090

COMPOSITE GLASS AND METAL ENVELOPE

Donnell W. Power, New Providence, N. J., assignor to Radio Corporation of America, a corporation of Delaware Application April 30, 1941, Serial No. 391,034

5 Claims. (Cl. 250—27.5)

My invention relates to envelopes, particularly to hermetically sealed envelopes for electron discharge devices and the like.

Attempts have been made to directly seal a glass disc or flat glass header into the end of a thin-walled metal shell. Unless the glass and metal have matched expansion characteristics, the glass-to-metal seal is mechanically weak and is characterized by shallow circular cracks in the glass adjacent the metal wall. Only special glasses and metals are at present known which can be sealed together, but they are expensive and are difficult to use in the factory.

The object of my invention is an improved envelope comprising a metal shell hermetically closed at one end with a glass header.

A more specific object of my invention is an improved envelope comprising a thin-walled metal shell sealed directly to a low-temperature soft glass header, the metal and glass having widely different thermal coefficients of expansion.

While my novel envelope may be used for many purposes, it is described in combination with a conventional radio tube. The envelope comprises a thin-walled metal shell 1 hermetically closed at one end with a round glass disc or header 2 telescoped into the end of the shell and sealed directly to the inner surface of the shell. Electrodes 3 within the envelope are connected to wires 4 sealed through the header. An exhaust tube 5 for evacuating and sealing the envelope may conveniently be joined to the center of the header. The shell may be of thin metal of the inexpensive commercial types, such as steel or iron, and the glass of the header may be of commercial lime or lead-borosilicate glass having a melting and sealing temperature of about 500 to 600° C. The shell, according to my invention, may be made with iron or steel having a thermal coefficient of expansion as high as $13.5 \times 10^{-6}$ and a glass header having a thermal coefficient of expansion as low as $8.7 \times 10^{-6}$.

Figure 1:
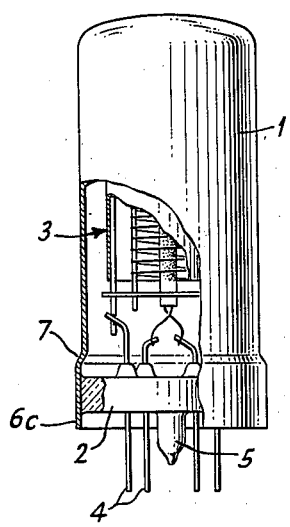
Figure 2:
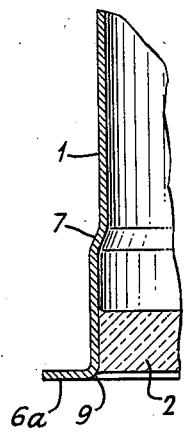
Figure 3:
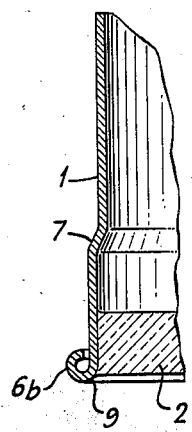
Figure 4:
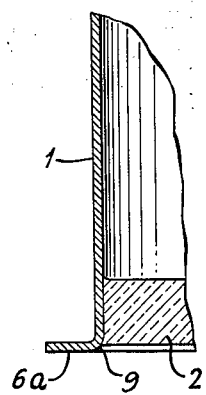

The characteristic feature of my invention which permits the sealing of a soft glass header in the end of a metal shell is a re-inforcing band along the rim of the shell opposite the outer surface of the header. If desired, this band may comprise a radial flange 6a integral with the rim of the shell as shown in Figure 2 or a rolled bead 6b as shown in Figure 3. If desired the re-inforcing band may comprise a ring of metal 6c integral with the rim of the shell and extending beyond the outer surface of the header. The wall of the metal shell above the header may have straight sides as shown in Figure 4 or may have an offset shoulder 7 as shown in Figures 1, 2 or 3.

The addition of the re-inforcing band 6a, 6b or 6c to the rim of the shell permits the manufacture of my novel glass and metal envelopes at the usual high speeds required in the radio tube factory. The seals are not sensitive to critical temperature conditions during sealing or during high temperature exhaust, and are strong and do not show the characteristic cracks in the glass in or along the seal.

One specific example of manufacture my novel envelope comprises applying a ring of enamel or low melting glass to the inner surface of the shell where the header seal is to be made. The shell is of cold rolled steel .700 inch in diameter with a wall thickness of .010 inch, and a thin plating of nickel. The shell is inclined slightly to a horizontal plane and rotated in flames played upon the rim of the shell while a thin stream of powdered glass is poured on the sealing area. One powdered glass or enamel which readily seals to the nickel plating and to the header consists of 72% lead oxide, PbO, 14% boric oxide, $B_2O_3$, and 14% silica, $SiO_2$, and has a melting point of about 300° C. and a thermal coefficient of expansion of about $8.7 \times 10^{-6}$. The shell is then lowered over the header with the enamel bead resting on the edge of the header and flames are applied to heat the shell and its rim to the softening point of the enamel. The header is slightly smaller in diameter than the shell yet larger than the enamel ring so that the shell may settle or be pushed down over the header only when the enamel is softened. The enamel fills the space, with small re-inforcing fillets, between the edge of the header and the inner wall of the shell and hermetically closes this space. The header found to give good results consists of lead glass, commercially known as Cornings' G–12 glass, only .100 inch in thickness, having a melting point of 500° to 600° C., and having a thermal coefficient of expansion of about $8.7 \times 10^{-6}$ at sealing temperature. Commercial "No. 12" lead glass has approximately the following chemical composition by weight, $SiO_2$ 57 parts; PbO 28 parts; $Na_2O$ 5 parts; $K_2O$ 3.5 parts; small amounts of iron-oxide, and alumina; and the usual impurities. The relatively low melting point of the enamel protects the header and minimizes the temperature range over which the seal region must cool after the seal is made and the glass set.

Figure 5:
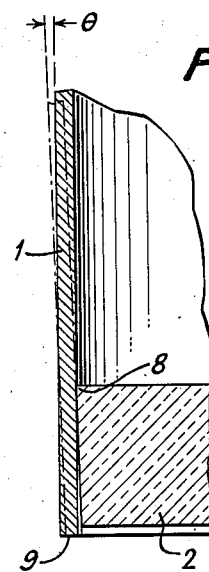

I am not certain why the re-inforcing band contributes to good glass-to-metal seals but it is my belief that the cause of stripped seals may be explained as follows: At the sealing temperature the entire shell is expanded to some diameter larger than its diameter at room temperature. After the seal has been made and the shell and seal region cools below the deformation temperature of the sealing glass, which is about 300° C., the header impedes further shrinking of the rim of the shell while the body of the shell above the seal continues to shrink. This causes the shell to assume a conical shape so that any longitudinal elemental section of the shell pivots, as shown in Figure 5, about a fixed point 8 on the corner of the header and in the plane of the inner surface of the header. Continued inward travel of the upper end of this section through an angle $\theta$, exaggerated in Figure 5 for clarity, causes the rim of this shell to travel outwardly. Since glass-to-metal seals are weak in tension, the seal strips. By re-inforcing the rim 9 with a band strong enough to resist the bending moment or leverage of the contacting shell wall, the stripping of the seal is prevented. Steel shells .700 inch in diameter and .01 inch thick may be sufficiently re-inforced to make good seals with a radial flange 6a only .03 inch in width. The longitudinal length of band 6c, or distance from the header to the rim in Figure 1, should be at least .05 inch.

My novel envelope is easy and inexpensive to manufacture, although the glass and metal may have widely different expansion characteristics.

I claim:

1. An envelope comprising a tubular drawn sheet steel shell, a glass disc fitted in the end of the shell and joined directly along its rim to the inside surface of the shell, a re-inforcing radially extending flange integral with the rim of the shell opposite the outer surface of the disc, said flange being strong enough to resist changes in diameter of the rim and to prevent stripping of the glass-to-metal seal.

2. An envelope comprising a cylindrical cold rolled steel metal shell, a glass disc fitted in the end of the shell and hermetically sealed directly to the inside cylindrical surface of the shell, the thermal coefficient of expansion of the glass being lower than the thermal coefficient of expansion of said shell, a re-inforcing band around the rim of the shell opposite the outer surface of said disc.

3. An envelope comprising a metal shell and a disc-type header of glass having a lower thermal coefficient of expansion than said shell, said header being telescoped into the end of said shell, a glass enamel between the edge of the header and wall of the shell and hermetically sealed to the header and shell, said enamel having a melting point substantially lower than the melting point of said header, and the rim of the shell being flared outwardly to form a strong reinforcing flange opposite the outer surface of said header.

4. An envelope comprising a tubular thin-walled shell of cold rolled steel, a disc of lead glass closing the end of said shell, a reinforcing flange of shell thickness integral with the rim of said shell, a low temperature enamel consisting of about 72% lead oxide, 14% boric oxide and about 14% silica, said enamel hermetically joining the periphery of said disc to the inside cylindrical surface of said shell.

5. An envelope comprising a cylindrical drawn steel shell about .7 inch in diameter and having a wall thickness of about .01 inch, a flat glass disc fitted in the end of the shell and hermetically sealed to the inside cylindrical surface of the shell, said disc being about .1 inch thick and composed essentially of two parts of silica for each part of lead oxide, and a radially extending flange integral with the rim of said shell, said flange extending at least .03 inch radially outward from the outer surface of said shell, said flange and the outer surface of said disc being approximately in the same plane.

DONNELL W. POWER.